US009673617B2

(12) United States Patent
Ngo

(10) Patent No.: US 9,673,617 B2
(45) Date of Patent: Jun. 6, 2017

(54) PRE-CHARGE CIRCUIT FOR AN ELECTROMECHANICAL RELAY

(71) Applicant: Tyco Electronics Corporation, Berwyn, PA (US)

(72) Inventor: Tien Duc Ngo, Oxnard, CA (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 614 days.

(21) Appl. No.: 14/177,316

(22) Filed: Feb. 11, 2014

(65) Prior Publication Data

US 2015/0229123 A1  Aug. 13, 2015

(51) Int. Cl.
- *H02M 3/06* (2006.01)
- *H02H 9/02* (2006.01)
- *H01H 9/54* (2006.01)

(52) U.S. Cl.
CPC ............ *H02H 9/026* (2013.01); *H01H 9/542* (2013.01); *H01H 2009/545* (2013.01)

(58) Field of Classification Search
CPC ...................................................... H02H 9/026
USPC ......................................................... 307/109
See application file for complete search history.

(56) References Cited

U.S. PATENT DOCUMENTS

| | | | |
|---|---|---|---|
| 4,816,818 A | 3/1989 | Roller | |
| 6,621,668 B1 | 9/2003 | Sare | |
| 7,660,083 B2* | 2/2010 | Yao | H01H 9/542 |
| | | | 218/143 |
| 2003/0016073 A1* | 1/2003 | Gelman | H03K 17/08144 |
| | | | 327/447 |
| 2004/0066587 A1* | 4/2004 | Schasfoort | H01H 9/542 |
| | | | 361/8 |
| 2007/0214331 A1* | 9/2007 | Murphy | G06F 21/78 |
| | | | 711/163 |
| 2007/0230229 A1* | 10/2007 | Bryan | B60L 11/005 |
| | | | 365/32 |
| 2013/0328515 A1* | 12/2013 | Kopiness | H02P 23/26 |
| | | | 318/558 |
| 2015/0256014 A1* | 9/2015 | Tzivanopoulos | B60L 11/1803 |
| | | | 320/107 |

OTHER PUBLICATIONS

International Search Report, International Application No. PCT/US2015/014069, International Filing Date, Feb. 2, 2015.

\* cited by examiner

*Primary Examiner* — Jared Fureman
*Assistant Examiner* — Esayas Yeshaw

(57) ABSTRACT

A pre-charge circuit is provided for an electromechanical relay having a coil and relay contacts. The pre-charge circuit includes a semiconductor switch configured to be electrically connected across the relay contacts of the electromechanical relay. The pre-charge circuit includes a resistor configured to be electrically connected in series with the semiconductor switch between the coil and the relay contacts of the electromechanical relay. The pre-charge circuit includes a driver configured to be electrically connected between the coil of the electromechanical relay and the semiconductor switch such that the driver is configured to power operation of the semiconductor switch. The semiconductor switch is configured to pre-charge a capacitor of a load of the electromechanical relay with electrical current through the resistor for limiting in-rush electrical current supplied to the relay contacts of the electromechanical relay.

20 Claims, 5 Drawing Sheets

PRE-CHARGE CIRCUIT FOR AN ELECTROMECHANICAL RELAY

BACKGROUND OF THE INVENTION

The subject matter described and/or illustrated herein relates generally to electromechanical relays, and more particularly, to a pre-charge circuit for an electromechanical relay.

Electromechanical relays are switches that open and close based on an applied electrical current. Different electromechanical relays may be used for different types of applications or based on certain operating parameters. In relatively high voltage applications, electromechanical relays are designed to handle the effects of the relatively high voltage. For example, relatively large capacitors, such as, larger than 500 micro-Farads (g), may be provided to power one or more loads (e.g., in a hybrid electric vehicle (HEV)). The capacitor(s) in this type of application must be pre-charged to avoid a damaging in-rush current being applied to the relay contacts of the electromechanical relay when electrical power is switched on. Essentially, when power is applied to an uncharged capacitor an excessive amount of current rushes to the capacitor. This relatively large in-rush of electrical current may damage the relay contacts of the electromechanical relay. For example, a relatively large in-rush of electrical current may cause the relay contacts of the electromechanical relay to be welded shut. Moreover, a relatively large in-rush of electrical current to the capacitor may cause excessive heating and thereby decrease the life of the capacitor.

In relatively high voltage applications, a pre-charge module may be used to pre-charge the capacitor(s). To pre-charge the capacitor(s), at least some known pre-charge modules include a solid state and/or electromechanical sub-relay in series with a resistor across the relay contacts of the main electromechanical relay that switches electrical power to the capacitor(s). But, pre-charge circuits using solid state and/or electromechanical sub-relays may suffer from reliability issues. For example, the moving switch parts of solid state and/or electromechanical sub-relays may fatigue and thereby ultimately malfunction and/or fail. Moreover, pre-charge circuits using solid state and/or electromechanical sub-relays may be relatively expensive and/or relatively large, which may limit space for other components.

BRIEF DESCRIPTION OF THE INVENTION

In an embodiment, a pre-charge circuit is provided for an electromechanical relay having a coil and relay contacts. The pre-charge circuit includes a semiconductor switch configured to be electrically connected across the relay contacts of the electromechanical relay. The pre-charge circuit includes a resistor configured to be electrically connected in series with the semiconductor switch between the coil and the relay contacts of the electromechanical relay. The pre-charge circuit includes a driver configured to be electrically connected between the coil of the electromechanical relay and the semiconductor switch such that the driver is configured to power operation of the semiconductor switch. The semiconductor switch is configured to pre-charge a capacitor of a load of the electromechanical relay with electrical current through the resistor for limiting in-rush electrical current supplied to the relay contacts of the electromechanical relay.

In an embodiment, an electromechanical relay is provided for a load that includes a capacitor. The electromechanical relay includes a coil and relay contacts. The electromechanical relay includes a pre-charge circuit electrically connected between the coil and the relay contacts. The pre-charge circuit is configured to pre-charge the capacitor of the load with electrical current for limiting in-rush electrical current supplied to the relay contacts. The pre-charge circuit includes a semiconductor switch.

In an embodiment, an electromechanical relay is provided for a load that includes a capacitor. The electromechanical relay includes a coil and relay contacts. The electromechanical relay includes a printed circuit board (PCB) having a pre-charge circuit that is electrically connected between the coil and the relay contacts. The pre-charge circuit includes a semiconductor electrically connected across the relay contacts, a resistor electrically connected in series with the semiconductor switch between the coil and the relay contacts, and a driver electrically connected between the coil and the semiconductor switch such that the driver is configured to power operation of the semiconductor switch. The semiconductor switch is configured to pre-charge the capacitor of the load with electrical current through the resistor for limiting in-rush electrical current supplied to the relay contacts.

DETAILED DESCRIPTION OF THE INVENTION

Figure 1:
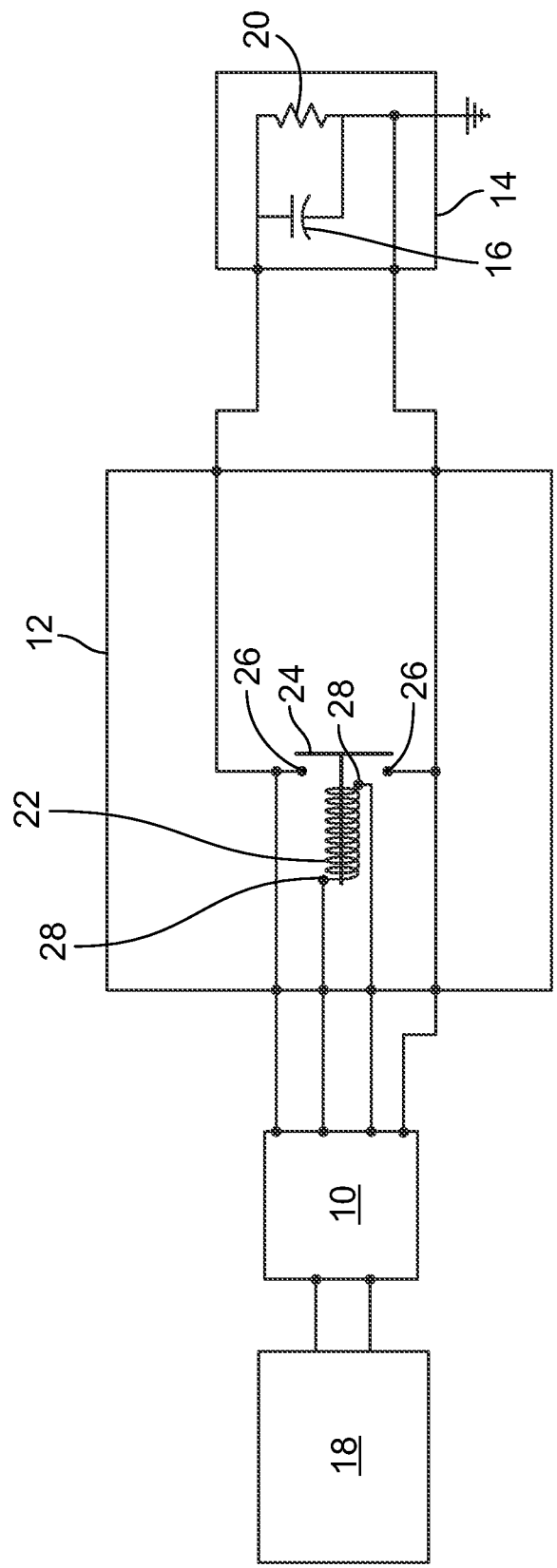
FIG. 1 is a schematic diagram of an exemplary electromechanical relay and an embodiment of a pre-charge circuit for the electromechanical relay.
Figure 2:
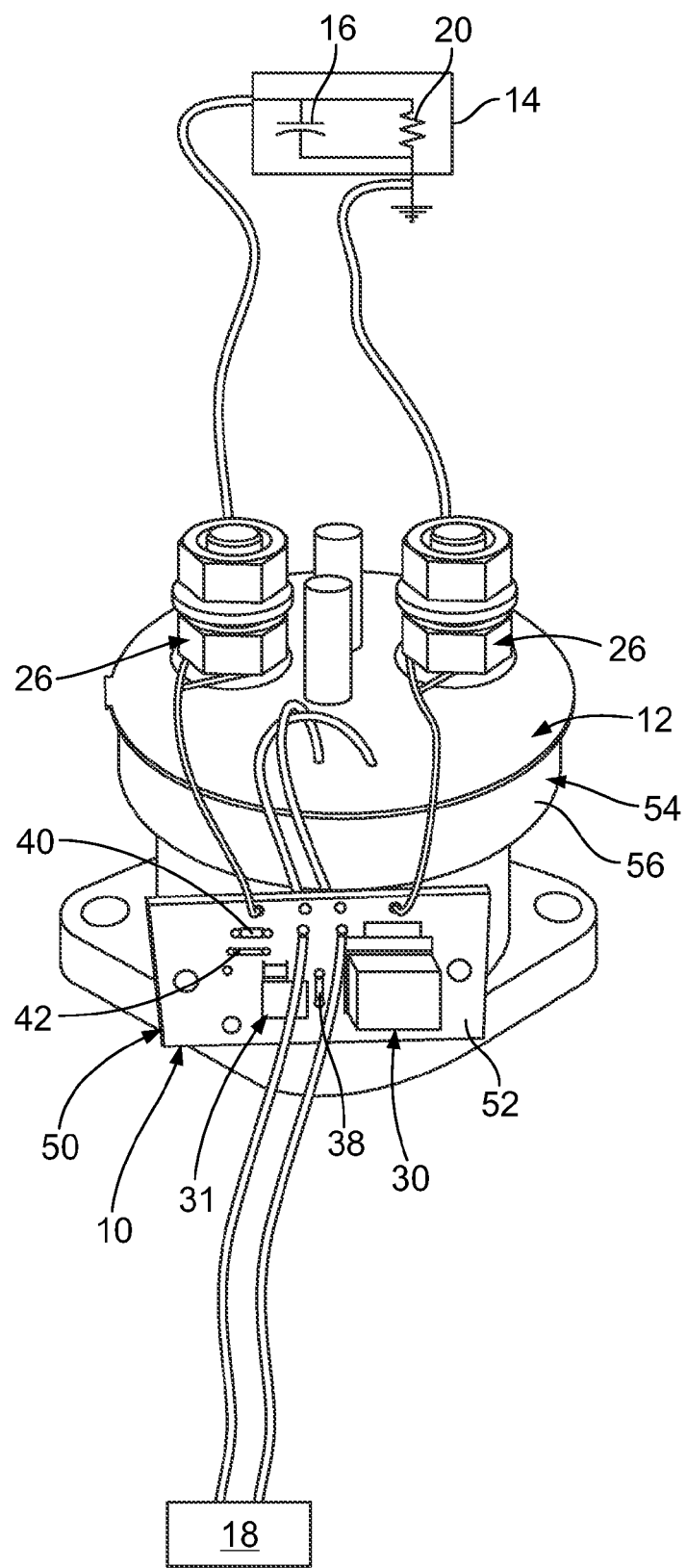
FIG. 2 is a perspective view of an embodiment of the electromechanical relay and the pre-charge circuit shown in FIG. 1.

FIG. 1 is a schematic diagram of an exemplary electromechanical relay 12 and an embodiment of a pre-charge circuit 10 for the electromechanical relay 12. FIG. 2 is a perspective view of an embodiment of the electromechanical relay 12 and the pre-charge circuit 10. The electromechanical relay 12 controls the supply of electrical power to an exemplary load 14 that includes one or more capacitors 16. Specifically, the electromechanical relay 12 is configured to switch electrical power on and off to the load 14 from an electrical power source 18. The electrical power source 18 may be any type of electrical power source, such as, but not limited to, a fuel cell, a battery, a generator, and/or the like. The electrical power source 18 may have any voltage depending on the application, such as, but not limited to, approximately 12 volts, at least approximately 200 volts, approximately 300 volts, at least approximately 300 volts, approximately 600 volts, at least approximately 600 volts, and/or the like. Other voltages may be used in different applications.

In the illustrated embodiment, the load 14 includes a single capacitor 16 in parallel with a single resistor 20. But, the load 14 may include any number of capacitors 16 that is equal to or greater than one. Moreover, the load 14 may include any number of resistors 20 and any number of other types of electrical circuit components. The load 14 is not limited to having the capacitor 16 electrically connected in parallel with the resistor 20. Rather, the various electrical circuit components of the load 14 may be electrically connected in any arrangement(s) relative to each other, for example any arrangements of series and/or parallel connections. The load 14 may be any type of load, such as, but not limited to, a load within a Hybrid Electric Vehicle (HEV).

Referring now solely to FIG. 1, the electromechanical relay 12 includes a coil 22, a contactor 24, and relay contacts 26. The contactor 24 may be commonly referred to as a "moveable contact" of the electromechanical relay 12. The relay contacts 26 may be commonly referred to as "stationary contacts" of the electromechanical relay 12. The coil 22 includes coil contacts 28. In operation, electrical current is applied to the coil 22 to move the contactor 24 into or out of engagement with the relay contacts 26, which are electrically connected to the load 14. The electrical circuit between the electrical power source 18 and the load 14 is thereby completed or broken depending on whether the contactor 24 is engaged or disengaged with the relay contacts 26. The load 14 may be considered a load "of" the electromechanical relay 12.

Referring again to FIGS. 1 and 2, the pre-charge circuit 10 is electrically connected between the electrical power source 18 and the electromechanical relay 12. The pre-charge circuit 10 is electrically connected across the coil contacts 28 (not visible in FIG. 2) and across the relay contacts 26 of the electromechanical relay 12. As will be described below, the pre-charge circuit 10 includes a semiconductor switch 30 (not shown in FIG. 1) and a resistor 32 (FIG. 3) that are electrically connected in series with each other between the coil contacts 28 and the relay contacts 26 of the electromechanical relay 12. It should be noted that although the pre-charge circuit 10 may be described in connection with a particular application or for a particular use, the various embodiments are not so limited and the pre-charge circuit 10 may be used in any application where pre-charging is needed or desired.

In operation, the pre-charge circuit 10 pre-charges the capacitor(s) 16 of the load 14. The capacitor(s) 16 of the load 14 may have any capacitance depending on the application, such as, but not limited to, a relatively large capacitance of at least approximately 500 micro-Farads (µF)m, at least approximately 1000 µF, at least approximately 2000 µF, at least approximately 3000 µF, approximately 3600 µF, at least approximately 3600 µF, and/or the like. Other capacitances may be used in different applications. The resistor(s) 20 of the load 14 may have any resistive current load depending on the application, such as, but not limited to, at least approximately 50 amps, at least approximately 100 amps, at least approximately 150 amps, at least approximately 200 amps, and/or the like. Other resistive current loads may be used in different applications. The resistor(s) 20 of the load 14 may have any resistance value depending on the application, such as, but not limited to, at least approximately 50 Ohms, at least approximately 100 Ohms, approximately 135 Ohms, and/or the like. Other resistance values may be used in different applications. The pre-charge circuit 10 may isolate a pre-charge voltage ground (e.g., an approximately 12 volt ground and/or the like) from a full power voltage ground (e.g., an approximately 300 volt ground, an approximately 600 volt ground, and/or the like).

The pre-charge circuit 10 switches on to pre-charge the capacitor(s) 16 when a ground is applied to the pre-charge circuit 10 and switches off (allowing the electromechanical relay 12 to switch on) when the capacitor(s) 16 has reached a predetermined pre-charge level, such as, but not limited to, above about eighty percent of the total charge capacity of the capacitor(s) 16, above about ninety percent of the total charge capacity of the capacitor(s) 16, above about ninety-five percent of the total charge capacity of the capacitor(s) 16, above about ninety-six percent of the total charge capacity of the capacitor(s) 16, about ninety-nine percent of the total charge capacity of the capacitor(s) 16 (which may be considered a full charge), and/or the like. But, the pre-charge circuit 10 may be configured to allow the capacitor(s) 16 to reach any predetermined pre-charge level that is higher or lower than the levels described herein.

Figure 3:
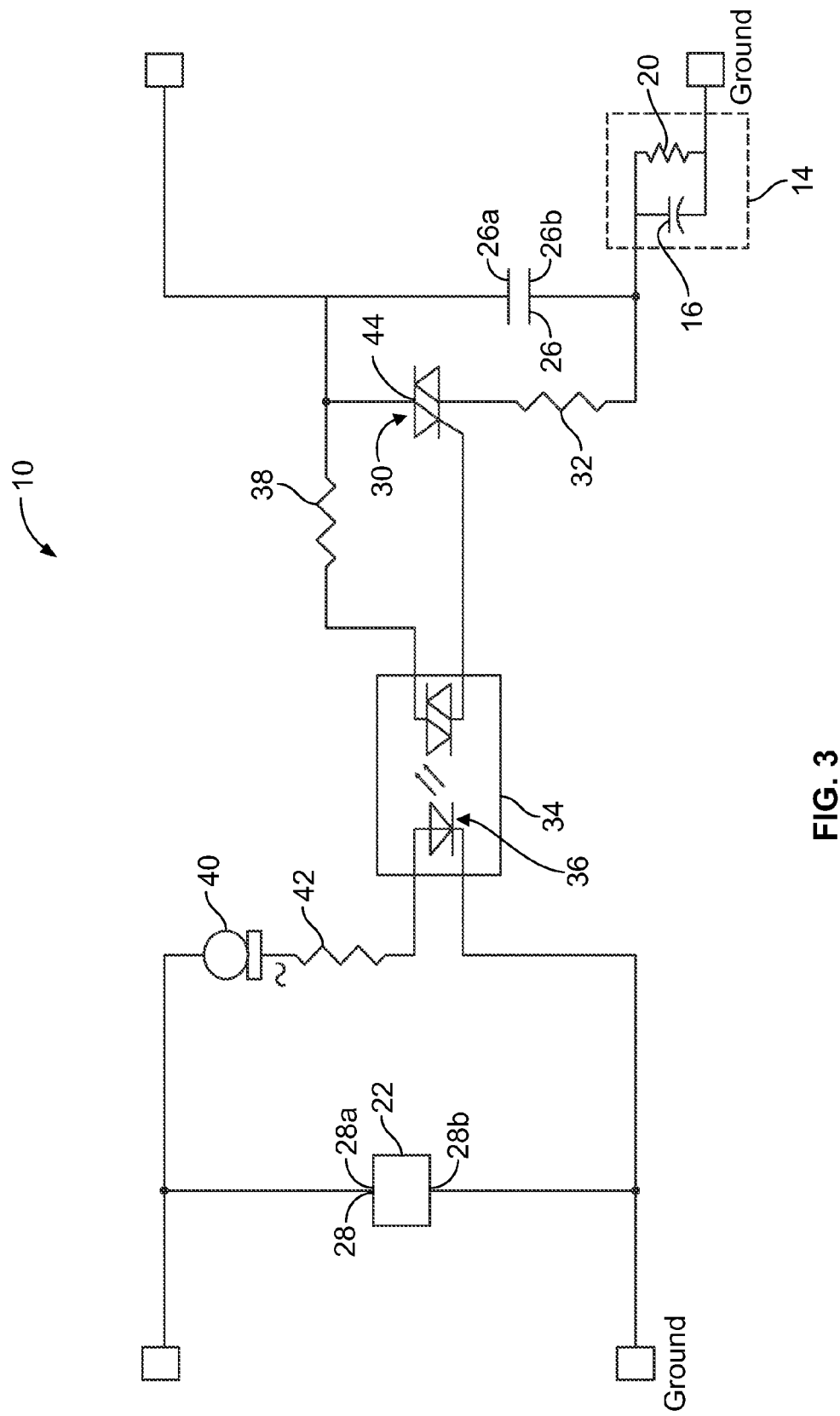
FIG. 3 is a circuit diagram of an embodiment of the pre-charge circuit shown in FIGS. 1 and 2.

FIG. 3 is a circuit diagram of an embodiment of the pre-charge circuit 10. The coil 22, the coil contacts 28, and the relay contacts 26 of the electromechanical relay 12 (FIGS. 1 and 2) are shown in FIG. 3. In the illustrated embodiment, the coil contacts 28 include a positive coil contact 28a and a negative (i.e., ground) coil contact 28b, and the relay contacts 26 include a positive relay contact 26a and a negative (i.e., ground) relay contact 26b. The load 14, including the capacitor 16 and the resistor 20, is also shown in FIG. 3.

The pre-charge circuit 10 includes the semiconductor switch 30 and the resistor 32, which are electrically connected in series with each other between the coil contacts 28 and the relay contacts 26 of the electromechanical relay 12. Specifically, the semiconductor switch 30 and the resistor 32 are electrically connected across the relay contacts 26a and 26b in series with each other. As can be seen in FIG. 3, the relay contacts 26a and 26b are electrically connected to the load 14.

As will be described in more detail below, the semiconductor switch 30 is configured to pre-charge the capacitor(s) 16 of the load 14 through (i.e., using) the resistor 32 for limiting in-rush electrical current supplied to the relay contacts 26 of the electromechanical relay 12. The semiconductor switch 30 may include any type of switch that does not include any mechanical switching components (e.g., a moveable electrical contact that engages in physical contact with another electrical contact contact). In other words, the semiconductor switch 30 is a solid-state switch that switches between two or more different states electrically without using any moving parts. One example of the semiconductor switch 30 is a thyristor, which is a solid-state semiconductor device with four layers of alternating N and P-type material that acts as a bistable switch. Examples of thyristors that may be used as, or included as a component of, the semiconductor switch 30 include, but are not limited to, a bidirectional triode thyristor, a silicon-controlled rectifier (SCR), and/or the like. In addition or alternatively, other types of thyristors and/or other types of semiconductor switches may be used as, or included as a component of, the semiconductor switch 30.

In the illustrated embodiment, the semiconductor switch 30 is a bidirectional triode thyristor, which is sometimes referred to as a "triode for alternating current (TRIAC)" and a "bilateral triode thyristor". Bidirectional triode thyristors are bidirectional such that the illustrated embodiment of the semiconductor switch 30 can conduct electrical current in either direction (i.e., electrical current can flow through the semiconductor switch 30 in either direction). The flow of electrical current through the illustrated embodiment of the semiconductor switch 30 can be enabled (i.e., triggered) by either a positive current or a negative current applied to a gate 44 of the semiconductor switch 30.

The resistor 32 may include any type of resistor that enables the semiconductor switch 30 to pre-charge the capacitor(s) 16 of the load 14 with electrical current through the resistor 32. For example, the resistor 32 may be (or include) a fixed resistor and/or the resistor 32 may be, or include, a thermistor. Any type of fixed resistor may be used as, or included as a component of, the resistor 32. Moreover, any type of thermistor may be used as, or included as a component of, the resistor 32, such as, but not limited to, a positive temperature coefficient (PTC) thermistor, a negative temperature coefficient (NTC) thermistor, and/or the like. The resistor 32 may be referred to herein as "pre-charge resistor".

The pre-charge circuit 10 includes a driver 34 that is electrically connected to the semiconductor switch 30 such that the driver 34 is configured to power operation of the semiconductor switch 30. Specifically, the driver 34 is configured to turn on the supply of electrical power to the semiconductor switch 30. In the illustrated embodiment, the driver 34 is electrically connected across the coil contacts 28a and 28b such that the driver 34 is electrically connected between the coil 22 and the semiconductor switch 30. The driver 34 may be any type of driver that enables the driver 34 to power operation of the semiconductor switch 30. In the illustrated embodiment, the driver 34 is an opto-isolator that includes a light emitting diode (LED) 36. Other types of drivers may be used in other embodiments. Moreover, the opto-isolator may be any type of opto-isolator that enables the driver 34 to power operation of the semiconductor switch 30. In the illustrated embodiment, the driver 34 is an S253 opto-isolator, but additionally or alternatively other types of opto-isolators may be used in other embodiments.

In the illustrated embodiment, the pre-charge circuit 10 includes a resistor 38 that is electrically connected in series between the driver 34 and the semiconductor switch 30. The driver 34 is configured to turn the supply of electrical power to the semiconductor switch 30 through (i.e., using) the resistor 38. The resistor 38 may be referred to herein as a "power resistor".

The pre-charge circuit 10 may include a current regulator 40 for regulating the electrical current supplied to the driver 34. Specifically, the current regulator 40 is configured to limit electrical current supplied to the driver 34. In the illustrated embodiment, the current regulator 40 is electrically connected across the coil contacts 28a and 28b of the coil 22 for regulating the electrical current supplied to the driver 34. The current regulator 40 may be any type of current regulator that enables the current regulator 40 to function as described and/or illustrated herein. In the illustrated embodiment, the current regulator 40 is a 5-123T current regulator, but additionally or alternatively other types of current regulators may be used in other embodiments.

A resistor 42 may be electrically connected in series with the current regulator 40 such that the current regulator 40 and the resistor 42 are electrically connected in series with each other between the coil 22 and the driver 34. In the illustrated embodiment, the current regulator 40 is configured to limit electrical current supplied to the driver 34 through (i.e., using) the resistor 42. The resistor 42 may be referred to herein as a "current-limiting resistor".

In operation, the pre-charge circuit 10 switches on to pre-charge the capacitor(s) 16 of the load 14 when a ground is applied to the pre-charge circuit 10. Electrical current is supplied to the driver 34 from the current regulator 40, which limits the value of the electrical current supplied to the driver 34 through the resistor 42. The current regulator 40 may limit the value of the electrical current supplied to the driver 34 by any amount. The resistor 42 may have any resistance value, which may be selected to limit the value of the electrical current supplied to the driver 34 by any amount. Examples of the resistance value of the resistor 42 include, but are not limited to, approximately 825 Ohms, at least approximately 500 Ohms, less than approximately 825 Ohms, greater than approximately 825 Ohms, and/or the like. Other resistance values may be used in different applications.

The driver 34 is electrically connected to the gate 44 of the semiconductor switch 30 through the resistor 38. The driver 34 is configured to turn on the supply of electrical power to the gate 44 of the semiconductor switch 30 through (i.e., using) the resistor 38. The resistor 38 may have any resistance value, which may be selected to provide any amount of electrical current and/or any voltage to the semiconductor switch 30. Examples of the resistance value of the resistor 38 include, but are not limited to, approximately 320 Ohms, at least approximately 200 Ohms, less than approximately 320 Ohms, greater than approximately 320 Ohms, and/or the like. Other resistance values may be used in different applications.

After a predetermined time period delay after the ground is applied to the pre-charge circuit 10, the supply of electrical current to the semiconductor switch 30 is turned on by the driver 34 to supply electrical current to the capacitor(s) 16 of the load 14 through the resistor 32 and thereby begin pre-charging of the capacitor(s) 16. The predetermined delay may be determined by the properties of the resistor 42 and/or the current regulator 40.

The predetermined delay and charging time for the capacitor(s) 16 are programmable and configurable, such as, but not limited to, based on the application, based on the properties of the capacitor(s) 16, and/or the like. The predetermined delay may be selected depending on a time constant of the resistor 32 and the capacitor(s) 16. For example, if the resistance value of the resistor 32 is approximately 10 Ohms and the capacitance value of the capacitor(s) 16 is approximately 3600 µF, then the charging time constant is 10*3600=36 milliseconds. Multiple time constants may be required to charge the capacitor(s) 16 to a predetermined percentage of the charging voltage before closing of the contactor 24 (FIG. 1) of the electromechanical relay 12. The resistor 32 may have any resistance value that enables the semiconductor switch 30 to pre-charge the capacitor(s) 16, which may be selected to provide the resistor 32 with a predetermined time constant, to provide the predetermined delay, and/or to provide a predetermined charging time. Examples of the resistance value of the resistor 32 include, but are not limited to, approximately 10 Ohms, at least approximately 5 Ohms, less than approximately 10 Ohms, greater than approximately 10 Ohms, and/or the like. Other resistance values may be used in different applications.

The pre-charge circuit 10 automatically switches off upon reaching the predetermined pre-charge level described herein. Specifically, when the capacitor(s) 16 has reached the predetermined pre-charge level, the driver 34 will stop driving (i.e., supplying electrical current to) the gate 44 of the semiconductor switch 30. Once the driver 34 has stopped driving the semiconductor switch 30, the flow of electrical current through the semiconductor switch 30 falls to zero, which unlatches the semiconductor switch 30 and thereby stops the pre-charging of the capacitor(s) 16. The contactor 24 of the electromechanical relay 12 does not close (i.e., engage the relay contacts 26) until the capacitor(s) 16 is pre-charged to the predetermined pre-charge level.

As described above, the predetermined pre-charge level may be any percentage of the total charge capacity of the capacitor(s) 16. The pre-charge circuit 10 may pre-charge the capacitor(s) 16 to any value in any amount of time. For example, for a capacitor 16 having a capacitive load of approximately 3600 μF and a resistor 20 having a resistive load of approximately 200 amps, the pre-charge circuit 10 may charge the capacitor 16 up to approximately 270 VDC in approximately 1 millisecond.

By pre-charging the capacitor(s) 16 to the predetermined pre-charge level, the pre-charge circuit 10 limits the in-rush electrical current that is supplied to the relay contacts 26 of the electromechanical relay 12. By limiting the in-rush electrical current, the pre-charge circuit 10 may facilitate preventing damage to the relay contacts 26 of the electromechanical relay 12 and/or to the capacitor(s) 16 of the load 14. For example, the pre-charge circuit 10 may facilitate preventing the relay contacts 26 from being welded shut to the contactor 24 and/or may facilitate reducing the amount of heating of the capacitor(s) 16. As should be understood from the description and figures presented herein, the pre-charge circuit 10 does not include a mechanical switch (e.g., a relay, an electromechanical relay, and/or the like). For example, the pre-charge circuit 10 does not include any mechanical switching components and does not include any moving parts.

The pre-charge circuit 10 may limit the in-rush electrical current supplied to the relay contacts 26 by any amount, which may be selected to facilitate preventing damage to the relay contacts 26 of the electromechanical relay 12 and/or to the capacitor(s) 16 of the load 14. As should be appreciated, the in-rush current and time to charge is dependent on different factors including, but not limited to, the power level of the electrical power source 18 (FIGS. 1 and 2), the type and capacity of the capacitor(s) 16, and/or the like. Thus, the pre-charge circuit 10 may be configured differently to pre-charge the capacitor(s) 16 based on the charging characteristics for the capacitor(s) 16.

Figure 4:
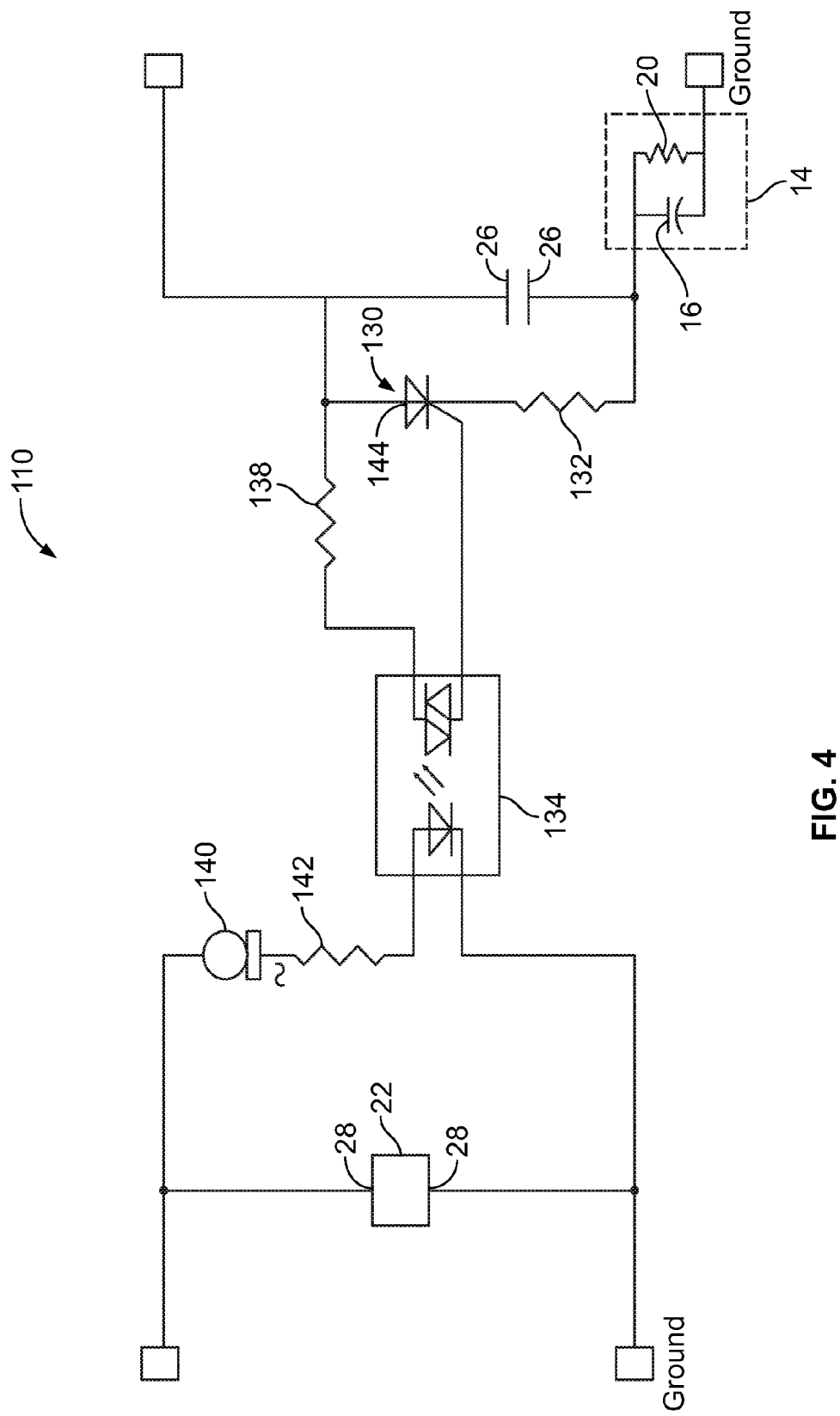
FIG. 4 is a circuit diagram of another embodiment of a pre-charge circuit.

FIG. 4 is a circuit diagram of another embodiment of a pre-charge circuit 110. The coil 22, the coil contacts 28, and the relay contacts 26 of the electromechanical relay 12 (FIGS. 1 and 2) are shown in FIG. 4. The load 14, including the capacitor 16 and the resistor 20, is also shown in FIG. 4.

The pre-charge circuit 110 includes a semiconductor switch 130 and a resistor 132, which are electrically connected in series with each other between the coil contacts 28 and the relay contacts 26 of the electromechanical relay 12. The semiconductor switch 130 may include any type of switch that does not include any mechanical switching components (e.g., a moveable electrical contact that engages in physical contact with another electrical contact contact). In other words, the semiconductor switch 130 is a solid-state switch that switches between two or more different states electrically without using any moving parts. In the illustrated embodiment, the semiconductor switch 130 is an SCR, which is sometimes referred to as a "semiconductor-controlled rectifier". SCR's are unidirectional such that the illustrated embodiment of the semiconductor switch 130 can conduct electrical current in only one direction (i.e., electrical current can flow through the semiconductor switch 130 in only one direction). The flow of electrical current through the illustrated embodiment of the semiconductor switch 130 can be enabled (i.e., triggered) by electrical current going into a gate 144 of the semiconductor switch 130.

The resistor 132 may include any type of resistor that enables the semiconductor switch 130 to pre-charge the capacitor(s) 16 of the load 14 with electrical current through the resistor 132. For example, the resistor 132 may be (or include) a fixed resistor and/or the resistor 132 may be, or include, a thermistor. Any type of fixed resistor may be used as, or included as a component of, the resistor 132. Moreover, any type of thermistor may be used as, or included as a component of, the resistor 132, such as, but not limited to, a positive temperature coefficient (PTC) thermistor, a negative temperature coefficient (NTC) thermistor, and/or the like. The resistor 132 may be referred to herein as "pre-charge resistor".

The pre-charge circuit 110 includes a driver 134 that is electrically connected to the semiconductor switch 130 such that the driver 134 is configured to power operation of the semiconductor switch 130. The driver 134 may be any type of driver that enables the driver 134 to power operation of the semiconductor switch 130, such as, but not limited to, an opto-isolator and/or the like. In the illustrated embodiment, the pre-charge circuit 110 includes a resistor 138 that is electrically connected in series between the driver 134 and the semiconductor switch 130. The driver 134 is configured to turn the supply of electrical power to the semiconductor switch 130 through (i.e., using) the resistor 138. The resistor 138 may be referred to herein as a "power resistor".

The pre-charge circuit 110 may include a current regulator 140 for regulating the electrical current supplied to the driver 134. The current regulator 140 may be any type of current regulator that enables the current regulator 140 to function as described and/or illustrated herein. A resistor 142 may be electrically connected in series with the current regulator 140. In the illustrated embodiment, the current regulator 140 is configured to limit electrical current supplied to the driver 134 through (i.e., using) the resistor 142. The resistor 142 may be referred to herein as a "current-limiting resistor".

In operation, the pre-charge circuit 110 switches on to pre-charge the capacitor(s) 16 of the load 14 when a ground is applied to the pre-charge circuit 110. Electrical current is supplied to the driver 134 from the current regulator 140, which limits the value of the electrical current supplied to the driver 134 through the resistor 142. The current regulator 140 may limit the value of the electrical current supplied to the driver 134 by any amount. The resistor 142 may have any resistance value, which may be selected to limit the value of the electrical current supplied to the driver 134 by any amount. Examples of the resistance value of the resistor 142 include, but are not limited to, approximately 825 Ohms, at least approximately 500 Ohms, less than approximately 825 Ohms, greater than approximately 825 Ohms, and/or the like.

The driver 134 is configured to turn on the supply of electrical power to the gate 144 of the semiconductor switch 130 through (i.e., using) the resistor 138. The resistor 138 may have any resistance value, which may be selected to provide any amount of electrical current and/or any voltage to the semiconductor switch 130. Examples of the resistance value of the resistor 138 include, but are not limited to, approximately 320 Ohms, at least approximately 200 Ohms, less than approximately 320 Ohms, greater than approximately 320 Ohms, and/or the like.

After a predetermined time period delay after the ground is applied to the pre-charge circuit 110, the supply of electrical current to the semiconductor switch 130 is turned on by the driver 134 to supply electrical current to the capacitor(s) 16 of the load 14 through the resistor 132 and thereby begin pre-charging of the capacitor(s) 16. The predetermined delay may be determined by the properties of the resistor 142 and/or the current regulator 140.

The predetermined delay and charging time for the capacitor(s) 16 are programmable and configurable, such as, but not limited to, based on the application, based on the properties of the capacitor(s) 16, and/or the like. The predetermined delay may be selected depending on a time constant of the resistor 132 and the capacitor(s) 16. Multiple time constants may be required to charge the capacitor(s) 16 to a predetermined percentage of the charging voltage before closing of the contactor 24 (FIG. 1) of the electromechanical relay 12. The resistor 132 may have any resistance value that enables the semiconductor switch 130 to pre-charge the capacitor(s) 16, which may be selected to provide the resistor 132 with a predetermined time constant, to provide the predetermined delay, and/or to provide a predetermined charging time. Examples of the resistance value of the resistor 132 include, but are not limited to, approximately 10 Ohms, at least approximately 5 Ohms, less than approximately 10 Ohms, greater than approximately 10 Ohms, and/or the like.

The pre-charge circuit 110 automatically switches off upon reaching the predetermined pre-charge level described herein. Once the driver 134 has stopped driving the semiconductor switch 130, the flow of electrical current through the semiconductor switch 130 falls to zero, which unlatches the semiconductor switch 130 and thereby stops the pre-charging of the capacitor(s) 16. The contactor 24 of the electromechanical relay 12 does not close (i.e., engage the relay contacts 26) until the capacitor(s) 16 is pre-charged to the predetermined pre-charge level. As described above, the predetermined pre-charge level may be any percentage of the total charge capacity of the capacitor(s) 16. The pre-charge circuit 110 may pre-charge the capacitor(s) 16 to any value in any amount of time.

By pre-charging the capacitor(s) 16 to the predetermined pre-charge level, the pre-charge circuit 110 limits the in-rush electrical current that is supplied to the relay contacts 26 of the electromechanical relay 12. By limiting the in-rush electrical current, the pre-charge circuit 110 may facilitate preventing damage to the relay contacts 26 of the electromechanical relay 12 and/or to the capacitor(s) 16 of the load 14. For example, the pre-charge circuit 110 may facilitate preventing the relay contacts 26 from being welded shut to the contactor 24 and/or may facilitate reducing the amount of heating of the capacitor(s) 16. As should be understood from the description and figures presented herein, the pre-charge circuit 110 does not include a mechanical switch (e.g., a relay, an electromechanical relay, and/or the like). For example, the pre-charge circuit 110 does not include any mechanical switching components and does not include any moving parts.

The pre-charge circuit 110 may limit the in-rush electrical current supplied to the relay contacts 26 by any amount, which may be selected to facilitate preventing damage to the relay contacts 26 of the electromechanical relay 12 and/or to the capacitor(s) 16 of the load 14. As should be appreciated, the in-rush current and time to charge is dependent on different factors including, but not limited to, the power level of the electrical power source 18 (FIGS. 1 and 2), the type and capacity of the capacitor(s) 16, and/or the like. Thus, the pre-charge circuit 110 may be configured differently to pre-charge the capacitor(s) 16 based on the charging characteristics for the capacitor(s) 16.

Each pre-charge circuit described and/or illustrated herein (e.g., the pre-charge circuit 10 shown in FIGS. 1-3, the pre-charge circuit 110 shown in FIG. 4, and the pre-charge circuit 210 shown in FIG. 5) is optionally a component of a printed circuit board (PCB) that includes one or more of the various components of the pre-charge circuit.

For example, and referring again to FIG. 2, the electromechanical relay 12 includes a PCB 50. The PCB 50 includes a substrate 52 and the various components of the pre-charge circuit 10. Specifically, in the illustrated embodiment, the PCB 50 includes the current regulator 40, the resistor 42, the driver 34, the resistor 38, the semiconductor switch 30, and the resistor 32 (not visible in FIG. 2), each of which are arranged on and/or within the substrate 52. In other embodiments, the PCB 50 only includes one or some of the various components of the pre-charge circuit 10.

As used herein, the terms "printed circuit board" and "PCB" are each intended to mean any electric circuit in which the conducting connections have been printed or otherwise deposited in predetermined patterns on an electrically insulating substrate. The substrate 52 of the PCB 50 may be a flexible substrate or a rigid substrate. The substrate 52 may be fabricated from and/or include any material(s), such as, but not limited to, ceramic, epoxy-glass, polyimide (such as, but not limited to, Kapton® and/or the like), organic material, plastic, polymer, and/or the like. In some embodiments, the substrate 52 is a rigid substrate fabricated from epoxy-glass. The PCB 50 may have any number of layers. Moreover, each of the various components (e.g., the current regulator 40, the resistor 42, the driver 34, the resistor 38, the semiconductor switch 30, and the resistor 32) of the pre-charge circuit 10 may be located on an exterior layer and/or an interior layer of the PCB 50. For example, one or more of the various components (e.g., the current regulator 40, the resistor 42, the driver 34, the resistor 38, the semiconductor switch 30, and the resistor 32) of the pre-charge circuit 10 may be embedded within the substrate 52.

In the illustrated embodiment of FIG. 2, the PCB 50 is shown in FIG. 2 as being mounted to an exterior side 54 of a housing 56 of the electromechanical relay 12. But, in addition or alternatively to being mounted to the exterior side 54 of the housing 56, the PCB 50 may be contained within the housing 56.

Figure 5:
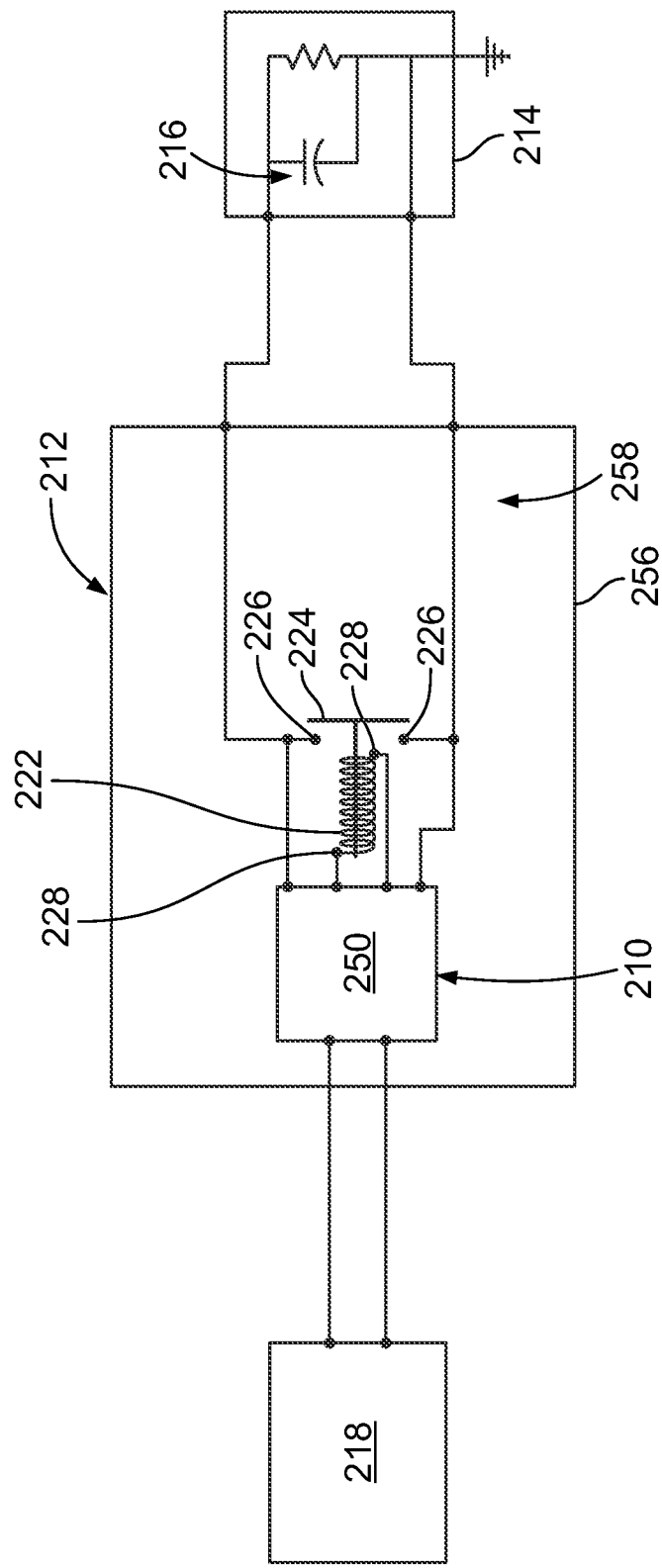
FIG. 5 is a schematic diagram of another exemplary electromechanical relay and another embodiment of a pre-charge circuit for the electromechanical relay.

For example, FIG. 5 is a schematic diagram of an exemplary electromechanical relay 212 and an embodiment of a pre-charge circuit 210 for the electromechanical relay 212. The electromechanical relay 212 controls the supply of electrical power from an electrical power source 218 to an exemplary load 214 that includes one or more capacitors 216. The electromechanical relay 212 includes a housing 256 having an internal chamber 258 that at least partially contains a coil 222, a contactor 224, and relay contacts 226. The load 214 may be considered a load "of" the electromechanical relay 212.

The pre-charge circuit 210 is electrically connected between the electrical power source 218 and the electromechanical relay 212. The pre-charge circuit 210 includes a semiconductor switch (not shown) and a resistor (not shown) that are electrically connected in series with each other between coil contacts 228 and relay contacts 226 of the electromechanical relay 212. In operation, the pre-charge circuit 210 pre-charges the capacitor(s) 216 of the load 214. The operation and components of the pre-charge circuit 210 are substantially similar to the pre-charge circuit 10 (FIGS. 1-3) and the pre-charge circuit 110 (FIG. 4). Accordingly, the operation and various components of the pre-charge circuit 210 will not be described in greater detail herein.

The electromechanical relay 212 includes a PCB 250. At least one of the various components (e.g., the semiconductor switch, the resistor, and/or the like) of the pre-charge circuit 210 is included as a component of (e.g., on and/or within)

the PCB 250. As can be seen in FIG. 5, the PCB 250 is entirely contained within the internal chamber 258 of the housing 256 of the electromechanical relay 212.

The embodiments described and/or illustrated herein provide a pre-charge circuit that pre-charges the capacitor(s) of a load of an electromechanical relay. The embodiments described and/or illustrated herein provide a pre-charge circuit that limits in-rush electrical current supplied to the relay contacts of an electromechanical relay. The embodiments described and/or illustrated herein provide a pre-charge circuit that may facilitate preventing damage to the relay contacts of an electromechanical relay and/or may facilitate preventing damage to capacitor(s) of a load of an electromechanical relay. The embodiments described and/or illustrated herein may provide a pre-charge circuit that pre-charges the capacitor(s) of a load of an electromechanical relay, that limits in-rush electrical current supplied to the relay contacts of the electromechanical relay, and/or that facilitates preventing damage to the relay contacts and/or the capacitor(s) without using a mechanical switch. The embodiments described and/or illustrated herein may provide a pre-charge circuit that is more reliable (e.g., less likely to fatigue, malfunction, and/or fail) as compared to at least some known pre-charge modules.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the subject matter described and/or illustrated herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A pre-charge circuit for an electromechanical relay having a coil and relay contacts, the pre-charge circuit comprising:
   a semiconductor switch configured to be electrically connected across the relay contacts of the electromechanical relay;
   a resistor configured to be electrically connected in series with the semiconductor switch between the coil and the relay contacts of the electromechanical relay; and
   a driver configured to be electrically connected between the coil of the electromechanical relay and the semiconductor switch such that the driver is configured to power operation of the semiconductor switch, wherein the semiconductor switch is configured to pre-charge a capacitor of a load of the electromechanical relay with electrical current through the resistor for limiting in-rush electrical current supplied to the relay contacts of the electromechanical relay.

2. The pre-charge circuit of claim 1, wherein the resistor is a pre-charge resistor, the pre-charge circuit further comprising a power resistor that is electrically connected between the driver and the semiconductor switch, the driver being configured to turn on supply of electrical power to the semiconductor switch through the power resistor.

3. The pre-charge circuit of claim 1, wherein the resistor is a pre-charge resistor, the pre-charge circuit further comprising a current regulator and a current-limiting resistor electrically connected in series with each other, the current regulator and the current-limiting resistor being configured to be electrically connected between the coil of the electromechanical relay and the driver, the current regulator being configured to limit electrical current supplied to the driver through the resistor.

4. The pre-charge circuit of claim 1, wherein the semiconductor switch comprises a bidirectional triode thyristor.

5. The pre-charge circuit of claim 1, wherein the semiconductor switch comprises a silicon-controlled rectifier (SCR).

6. The pre-charge circuit of claim 1, wherein the resistor comprises a fixed resistor.

7. The pre-charge circuit of claim 1, wherein the resistor comprises at least one of a thermistor or a positive temperature coefficient (PTC) thermistor.

8. The pre-charge circuit of claim 1, wherein the driver comprises an opto-isolator.

9. The pre-charge circuit of claim 1, wherein the semiconductor switch, the resistor, and the driver are components of a printed circuit board (PCB) that is configured to be at least one of mounted to the electromechanical relay or contained within a housing of the electromechanical relay.

10. An electromechanical relay for a load that includes a capacitor, the electromechanical relay comprising:
    a coil;
    relay contacts; and
    a pre-charge circuit electrically connected between the coil and the relay contacts, the pre-charge circuit being configured to pre-charge the capacitor of the load with electrical current for limiting in-rush electrical current supplied to the relay contacts, wherein the pre-charge circuit comprises a semiconductor switch, wherein the semiconductor switch is configured to be electrically connected across the relay contacts of the electromechanical relay.

11. The electromechanical relay of claim 10, wherein the pre-charge circuit does not include a mechanical switch.

12. The electromechanical relay of claim 10, wherein the semiconductor switch of the pre-charge circuit is configured to pre-charge the capacitor of the load with electrical current.

13. The electromechanical relay of claim 10, wherein the pre-charge circuit comprises a resistor electrically connected in series with the semiconductor switch between the coil and the relay contacts.

14. The electromechanical relay of claim 10, wherein the semiconductor switch comprises one of a bidirectional triode thyristor or a silicon-controlled rectifier (SCR).

15. The electromechanical relay of claim 10, further comprising a housing and a printed circuit board (PCB), the PCB comprising the pre-charge circuit, the PCB being configured to be at least one of mounted to an exterior side of the housing or contained within the housing.

16. An electromechanical relay for a load that includes a capacitor, the electromechanical relay comprising:
    a coil;
    relay contacts; and
    a printed circuit board (PCB) comprising a pre-charge circuit electrically connected between the coil and the relay contacts, the pre-charge circuit comprising:
    a semiconductor switch electrically connected across the relay contacts;
    a resistor electrically connected in series with the semiconductor switch between the coil and the relay contacts; and
    a driver electrically connected between the coil and the semiconductor switch such that the driver is configured to power operation of the semiconductor switch, wherein the semiconductor switch is configured to pre-charge the capacitor of the load with electrical current through the resistor for limiting in-rush electrical current supplied to the relay contacts.

17. The electromechanical relay of claim 16, wherein the semiconductor switch comprises a bidirectional triode thyristor.

18. The electromechanical relay of claim 16, wherein the semiconductor switch comprises a silicon-controlled rectifier (SCR).

19. The electromechanical relay of claim 16, wherein the resistor comprises one of a fixed resistor or a thermistor.

20. The electromechanical relay of claim 16, further comprising a housing the PCB being configured to be at least one of mounted to an exterior side of the housing or contained within the housing.

* * * * *